(12) United States Patent
Kroeger et al.

(10) Patent No.: US 8,473,174 B2
(45) Date of Patent: Jun. 25, 2013

(54) METHOD FOR DETERMINING THE VEHICLE LONGITUDINAL VELOCITY IN A VEHICLE

(75) Inventors: Patrick Kroeger, Heilbronn (DE); Sergey Antonov, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/378,083

(22) PCT Filed: Aug. 17, 2010

(86) PCT No.: PCT/EP2010/061942
§ 371 (c)(1),
(2), (4) Date: Mar. 15, 2012

(87) PCT Pub. No.: WO2011/023591
PCT Pub. Date: Mar. 3, 2011

(65) Prior Publication Data
US 2012/0179348 A1    Jul. 12, 2012

(30) Foreign Application Priority Data

Aug. 31, 2009  (DE) .......................... 10 2009 029 018

(51) Int. Cl.
*B60T 8/17*    (2006.01)
(52) U.S. Cl.
USPC ................................. 701/80; 303/146; 701/74

(58) Field of Classification Search
USPC .............................. 303/146, 147; 701/74, 80
See application file for complete search history.

(56) References Cited

U.S. PATENT DOCUMENTS

| 6,015,192 A | 1/2000 | Fukumura |
| 6,611,781 B1 | 8/2003 | Gutmann |
| 6,659,570 B2 * | 12/2003 | Nakamura ................... 303/146 |
| 2003/0163226 A1 | 8/2003 | Tan |

FOREIGN PATENT DOCUMENTS

| DE | 19936710 | 2/2001 |
| DE | 10259272 | 10/2003 |
| FR | 2871889 | 12/2005 |
| WO | WO 2007/048947 | 5/2007 |

OTHER PUBLICATIONS

International Search Report, PCT International Application No. PCT/EP2010/061942, dated Nov. 10, 2010.

* cited by examiner

*Primary Examiner* — Mary Cheung
*Assistant Examiner* — Yuen Wong
(74) *Attorney, Agent, or Firm* — Kenyon & Kenyon LLP

(57) ABSTRACT

In a method for determining the vehicle longitudinal velocity in a vehicle, a wheel longitudinal force is determined in an estimation equation as a function of the wheel speeds and the vehicle longitudinal velocity is ascertained as a function of the wheel longitudinal force.

12 Claims, 1 Drawing Sheet

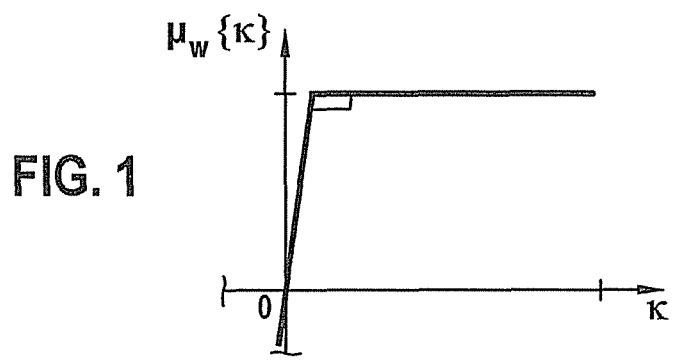
FIG. 1
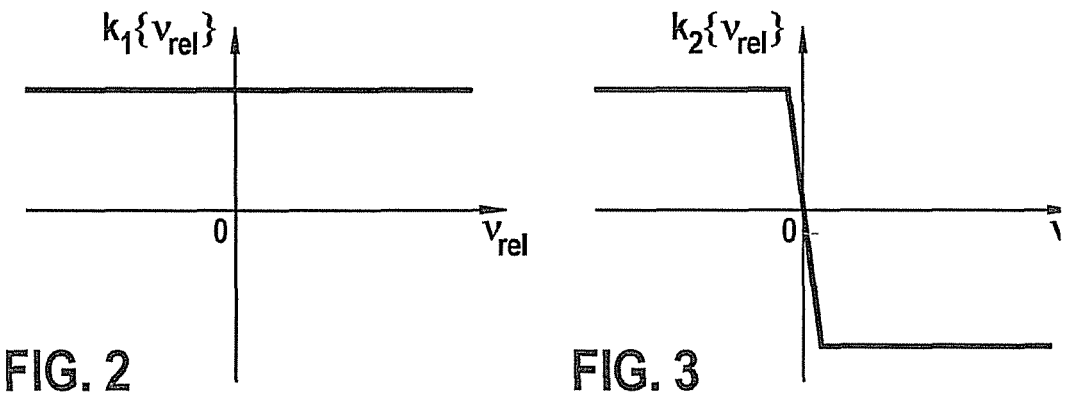
FIG. 2
FIG. 3
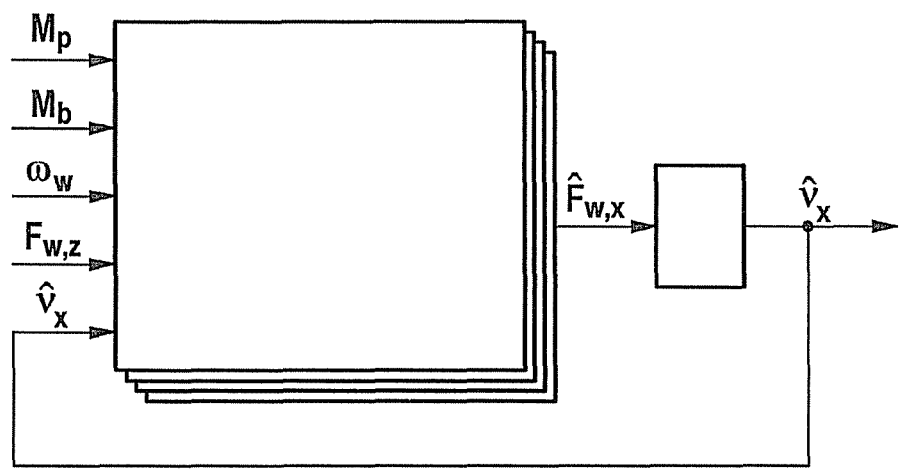
FIG. 4

METHOD FOR DETERMINING THE VEHICLE LONGITUDINAL VELOCITY IN A VEHICLE

FIELD OF THE INVENTION

The present invention relates to a method for determining the vehicle longitudinal velocity in a vehicle.

BACKGROUND INFORMATION

A method for determining a vehicle reference velocity is described in German Patent No. DE 102 59 272 A1, in which various calculation paths are followed on the basis of acceleration values ascertained by sensors, in order to obtain preliminary individual values for the vehicle speed. The individual values for the vehicle velocity are weighted, the desired vehicle reference velocity being calculated as the mean value of the weighted individual velocities.

Ascertaining weighted variables for the individual wheel velocity values on the basis of a sensor system of an electronic stability program (ESP), which includes a lateral acceleration sensor, a yaw rate sensor, and four wheel speed probes, and calculating a mean value, which represents a support variable, as a function of the weighted wheel velocity values, is described in German Patent No. DE 199 36 710 A1.

Both in German Patent No. DE 102 59 272 A1 and also in German Patent No. DE 199 36 710 A1, the velocity variable to be ascertained is calculated on the basis of the free rolling wheel velocities, which are obtained from mathematical models, which only have a restricted validity, however. In the case of more complex models, via which the vehicle velocity may be ascertained with higher quality, a nonlinear model or a nonlinear algorithm is typically used, which may only be analyzed with increased computing effort, however.

SUMMARY

An object of the present invention is to determine the vehicle longitudinal velocity in a vehicle with high quality and reduced computing effort.

Using an example method according to the present invention, the vehicle longitudinal velocity in a vehicle may be determined, preferably solely on the basis of an ESP (electronic stability program) sensor system, which includes one rotational speed probe per vehicle wheel, a yaw rate sensor, and an acceleration sensor. The example method requires only a comparatively low computing effort and nonetheless allows the ascertainment of the vehicle longitudinal speed with comparatively high quality.

The foundation of the example method is the determination of wheel longitudinal forces individual to the wheel in an estimation equation as a function of the wheel speeds and subsequently ascertaining the vehicle longitudinal velocity as a function of the particular wheel longitudinal force. The wheel longitudinal force is a function of various variables, in particular the roadway coefficient of friction, a longitudinal slip coefficient of friction, which is caused by the longitudinal slip on the tires, and the wheel contact force. The wheel contact force is known per se; it is provided either as a stationary value, which is calculated from the vehicle mass, or is determined from estimation equations, which are stored in a regulating or control unit in the vehicle. The longitudinal slip coefficient of friction is ascertained as a function of the wheel speed and the vehicle longitudinal velocity; the roadway coefficient of friction, which is typically not detected by technical measurement, is calculated from a differential equation system as a function of wheel torques and forces. Furthermore, the wheel speeds are expediently also computed in addition to the measurement, the difference between measured and estimated variables being evaluated in an observer equation system. The driving and braking torques on the wheel may also be computed or determined from measured variables, for example, the engine drive torque or the brake pressure in the brake circuit.

The equations which describe the wheel dynamic response are expediently based on an observation system, in particular a nonlinear Luenberger observer, the observer equation in the observer part including an amplification vector having scalar amplification factors, which are either predefined as constant variables or are ascertained as a function of state variables of the vehicle. In a preferred embodiment, at least one of the amplification factors is a function of the relative wheel velocity, which is ascertained as the difference of the calculated wheel speed multiplied by the wheel radius and calculated vehicle velocity. For example, a first amplification factor is set to an at least approximately constant positive value, while in contrast the second amplification factor in the amplification vector is set to different values in the case of a braked wheel and in the case of a driven wheel. In the case of a braked wheel, the second amplification factor expediently assumes an approximately constant positive value; in the case of a driven wheel, it expediently assumes an at least approximately constant negative value. In the transition between positive and negative values, the amplification factor runs at least approximately linearly as a function of the relative wheel velocity.

These equations adequately describe the wheel dynamic response. The wheel longitudinal force, on which the calculation of the vehicle longitudinal velocity is based, may be determined from the equations of the wheel dynamic response. In this case, a differential equation is expediently established for the vehicle longitudinal velocity, which is a function of the sum of the individual wheel longitudinal forces per vehicle wheel, divided by the vehicle mass.

Overall, in this way a differential-algebraic equation system is obtained, which includes an observer, the equation system being able to be solved with high precision and comparatively little computing time. Accordingly, in the case of an implementation in a regulating or control unit in the vehicle, the vehicle longitudinal velocity may be ascertained rapidly and with high quality, fundamentally solely based on the ESP sensor system. The regulating or control unit in which the method is executed is expediently part of a driver assistance system, for example, an electronic stability program or an antilock braking system, or is assigned to such a driver assistance system.

BRIEF DESCRIPTION OF THE DRAWINGS

FIG. 1 shows a diagram having a simplified view of the longitudinal slip coefficient of friction as a function of the wheel longitudinal slip.

FIG. 2 shows a diagram having a first amplification factor, which is used in an observer, as a function of the relative wheel velocity.

FIG. 3 shows a diagram having a second amplification factor, which is part of the observer, also as a function of the relative wheel velocity.

FIG. 4 shows a block diagram of the estimator of the vehicle longitudinal velocity.

DETAILED DESCRIPTION OF EXAMPLE EMBODIMENTS

The following exemplary embodiment is based on a vehicle having four wheel speed probes, for example, from a standard ESP sensor system, which additionally has a yaw rate sensor and a lateral acceleration sensor, so that the wheel speeds at each vehicle wheel, the yaw rate, and the lateral acceleration in the vehicle may be determined by sensors. A requirement for the performance of the example method is the information of the wheel speed probes, the information of the yaw rate sensor and of the lateral acceleration sensor optionally being able to be used to improve the precision. In addition, the drive and braking torques of individual wheels are also to be available as estimated values, the brake pressures in the wheel brake cylinders optionally being able to be measured individually in the brake system of the vehicle, whereby the estimation of the wheel torques is improved.

The relationships which describe the wheel dynamic response will be explained first:

Longitudinal force $F_{w,x}$ which is effectively utilized in the contact area between the tire and the roadway is a function of various factors. For the estimation of longitudinal velocity $v_x$, it may approximately be represented by $$F_{w,x} = \max\{\mu_{road}, \mu_w\{\kappa\}\} \cdot F_{w,z}.$$

In this case, $\mu_{road}$ is the coefficient of friction caused by the roadway, $\mu_w\{\kappa\}$ is the coefficient of friction caused by the longitudinal slip, and $F_{w,z}$ is the contact force of the wheel.

As shown in FIG. 1, longitudinal slip coefficient of friction $\mu_w$ initially increases linearly and with greater slope with wheel longitudinal slip ($\kappa$) and remains at an at least approximately constant value upon reaching a limiting value.

Longitudinal slip ($\kappa$) is given by $$\kappa = \begin{cases} \dfrac{\omega_w r_w - v_x}{\omega_w r_w} & \text{for } \omega_w r_w > v_x \\ \dfrac{\omega_w r_w - v_x}{v_x} & \text{for } \omega_w r_w < v_x \end{cases}$$

for driving and braking, respectively, where $\omega_w$ designates the wheel speed and $r_w$ designates the wheel radius. The wheel movement may therefore be described as a function of wheel moment of inertia $J_w$, wheel drive torque $M_p$, wheel braking torque $M_b$, and wheel longitudinal force $F_{w,x}$ by the following differential equation:

$$\omega_w = \frac{1}{J_w}(M_p - M_b - F_{w,x} r_w).$$

The above-described equations form the foundation for the description of the wheel dynamic response, but are completed by the observation of roadway coefficient of friction $\mu_{road}$, which reflects the traction of the current roadway. This variable may not be detected by technical measurement in mass production vehicles, but it has a great influence on the wheel dynamic response and therefore also on the vehicle dynamic response. For these reasons, the unknown behavior of coefficient of friction $\mu_{road}$ having a dynamic response as a function of the system excitation is modeled according to the following differential equation:

$$\dot{\mu}_{road} = \mu_{road} g\{M_p, M_b, F_{w,z}\},$$

where $g\{M_p, M_b, F_{w,z}\}$ designates a standardized algebraic function, which contains the wheel torques and forces.

Wheel speed $\omega_w$ is used as output y of the model:

$$y = \omega_w.$$

The mathematical system description is introduced for the further observations in functional form:

$$\dot{\hat{x}} = f\{\hat{x}, u\},$$

$$\hat{y} = h\{\hat{x}\},$$

with $$\hat{x} = [\hat{\omega}_w, \hat{\mu}_{road}]^T, u = [M_p, M_b, F_{w,z}, v_x]^T, \hat{y} = \hat{\omega}_w.$$

A nonlinear Luenberger observer may be established for this system as follows:

$$\dot{\hat{x}} = f\{\hat{x}, u\} - k\{\hat{x}, u\}(\hat{y} - y),$$

$$\hat{y} = h\{\hat{x}\}.$$

Therein, $k\{\hat{x}, u\}$ designates an amplification vector of the observer, which has both amplification factors $k_1, k_2$:

$$k\{\hat{x}, u\} = [k_1, k_2]^T,$$

where amplification factors $k_1, k_2$ are ascertained as a function of relative wheel velocity $\hat{v}_{rel}$ according to $$k_1 = k_1\{\hat{v}_{rel}\}$$

$$k_2 = k_2\{\hat{v}_{rel}\}.$$

Relative wheel velocity $\hat{v}_{rel}$ is determined as a function of calculated wheel speed $\hat{\omega}_w$, wheel radius $r_w$, and calculated vehicle longitudinal velocity $\hat{v}_x$ according to $$\hat{v}_{rel} = \hat{\omega}_w r_w - \hat{v}_x$$

As may be inferred from FIG. 2, first amplification factor $k_1$ is set to an at least approximately constant, positive value, a linear or nonlinear dependency on relative wheel velocity $\hat{v}_{rel}$ optionally also coming into consideration.

The curve of second amplification factor $k_2$ is shown in FIG. 3. Second amplification factor $k_2$ is set to an at least approximately constant, positive value in the case of a braked wheel (left half of diagram) and is set to an at least approximately constant, negative value in the case of a driven wheel (right half of the diagram), second amplification factor being an at least approximately linear function, but with greater slope, of relative wheel velocity $\hat{v}_{rel}$ in the transition from the positive to the negative value.

Alternatively, the dependency of the amplification factors may also be related to another variable related to relative velocity $\hat{v}_{rel}$, for example, longitudinal slip $\kappa$.

With the aid of the present model and the estimator, the wheel dynamic response and the unknown roadway coefficient of friction may be ascertained. Current estimated tire force $\hat{F}_{w,x}$ in the longitudinal direction may thus be calculated at any time.

Fundamentally, other methods may also be used for calculating amplification vector k. Comparable results may be achieved using an unscented Kalman filter (UKF) and using a linear Kalman filter (KF). However, the above-described Luenberger observer requires significantly less calculation time and fewer memory resources.

Estimated tire forces $\hat{F}_{w,x}$ of all wheels are used to ascertain longitudinal velocity $\hat{v}_x$ of the vehicle according to the movement equation $$\hat{v}_x = \frac{1}{m}\sum \hat{F}_{w,x}.$$

If this movement equation is combined with the equations describing the wheel dynamic response, the complete sequence for estimating the longitudinal velocity results, see FIG. 4. This concept may be used in the case of front-wheel drive, rear-wheel drive, and all-wheel drive.

As shown in FIG. 4, drive torque $M_p$, braking torque $M_b$, wheel speed $\omega_w$, and wheel contact force $F_{w,z}$ for each wheel are entered in the calculation block as input variables. In addition, a previously ascertained value for vehicle longitudinal velocity $\hat{v}_x$ is supplied to the calculation block.

In the calculation block, the wheel dynamic response is calculated according to the above-described wheel equations, which are carried out for each vehicle wheel. Calculated wheel longitudinal force $F_{w,x}$ for each vehicle wheel, which is used in a further calculation block for ascertaining vehicle longitudinal velocity $\hat{v}_x$, is available at the output of the calculation block. Since this is a recursive algorithm, output-side vehicle longitudinal velocity $\hat{v}_x$ is supplied to the first calculation block as an input variable.

What is claimed is:

1. A method for determining the vehicle longitudinal velocity in a vehicle, comprising:
   ascertaining wheel speed using a sensor;
   determining a wheel longitudinal force as a function of the wheel speed; and
   ascertaining vehicle longitudinal velocity as a function of the wheel longitudinal force;
   wherein the wheel longitudinal force ($F_{w,x}$) is ascertained as a function of the wheel contact force ($F_{w,z}$), a roadway coefficient of friction ($\mu_{road}$), and a longitudinal slip coefficient of friction ($\mu_w$) which is a function of a wheel longitudinal slip (K):

$F_{w,x} = \max\{\mu_{road}, \mu_w\{\kappa\}\} \cdot F_{w,z}$;

wherein, for equations describing wheel dynamic response $\dot{\hat{x}} = f\{\hat{x}, u\} \dot{\hat{x}} = f\{\hat{x}, u\}$ $\hat{y} = h\{\hat{x}\}$ with $\hat{x} = [\hat{\omega}_w, \hat{\mu}_{road}]^T$ $u = [M_p, M_b, F_{w,z}, v_x]^T$ $\hat{y} = \hat{\omega}_w,$ an observer equation system of the form $\dot{\hat{x}} = f\{\hat{x}, u\} - k\{\hat{x}, u\}(\hat{y} - y),$ $\hat{y} = h\{\hat{x}\}$ is established, the amplification vector ($k\{\hat{x}, u\}$) containing two amplification factors $k_1, k_2$, which are one of constant or dependent on a state variable.

2. The method as recited in claim 1, wherein the wheel longitudinal slip (K) is a function of the wheel speeds ($\omega_w$), the tire radius ($r_w$), and the vehicle longitudinal velocity ($v_x$):

$$\kappa = \begin{cases} \dfrac{\omega_w r_w - v_x}{\omega_w r_w} & \text{for } \omega_w r_w > v_x \\ \dfrac{\omega_w r_w - v_x}{v_x} & \text{for } \omega_w r_w < v_x, \end{cases}$$

for driving and braking, respectively.

3. The method as recited in claim 1, wherein the longitudinal slip coefficient of friction ($\mu_w$) increases linearly with the wheel longitudinal slip (K) and remains at a constant value upon reaching a limiting value.

4. The method as recited in claim 1, wherein a wheel rotational movement is determined as a function of a wheel moment of inertia ($J_w$), a wheel drive torque ($M_p$), a wheel braking torque ($M_b$), and the wheel longitudinal force ($F_{w,x}$) via a differential equation:

$$\dot{\omega}_w = \frac{1}{J_w}(M_p - M_b - F_{w,x} r_w).$$

5. The method as recited in claim 1, wherein the roadway coefficient of friction ($\mu_{road}$) is determined as a function of a wheel drive torque($M_p$), a wheel braking torque ($M_b$), and the wheel contact force ($F_{w,z}$) via a differential equation:

$\dot{\mu}_{road} = \mu_{road} g\{M_p, M_b, F_{w,z}\}.$

6. The method as recited in claim 1, wherein at least one amplification factor ($k_1, k_2$) of the amplification vector ($k\{\hat{x}, u\}$)

$k\{\hat{x}, u\} = [k_1 k_2]^T$ is determined as a function of one of a the relative wheel velocity ($\hat{v}_{rel}$) or a variable correlated therewith according to $k_1 = k_1\{\hat{v}_{rel}\}$ $k_2 = k_2\{\hat{v}_{rel}\}$ the relative wheel velocity($\hat{v}_{rel}$) being determined as a function of a calculated wheel speed ($\hat{\omega}_w$), the wheel radius ($r_w$), and a calculated vehicle longitudinal velocity ($\hat{v}_x$) according to $\hat{v}_{rel} = \hat{\omega}_w r_w - \hat{v}_x.$ 7. The method as recited in claim 6, wherein the first amplification factor ($k_1$) of the amplification vector ($k\{\hat{x}, u\}$) is set to an at least approximately constant, positive value.

8. The method as recited in claim 7, wherein the second amplification factor ($k_2$) of the amplification vector ($k\{\hat{x}, u\}$) is set to an at least approximately constant, positive value in the case of a braked wheel and is set to an at least approximately constant, negative value in the case of a driven wheel, the second amplification factor ($k_2$) being an at least approximately linear function of the relative wheel velocity ($\hat{v}_{rel}$) in the transition from positive to negative values.

9. The method as recited in claim 1, wherein the calculated vehicle longitudinal velocity ($\hat{v}_x$) is ascertained as a function of the calculated wheel longitudinal forces ($\hat{F}_{w,x}$) on the vehicle wheels from the movement equation $$\hat{v}_x = \frac{1}{m} \sum \hat{F}_{w,x}.$$

10. A regulating or control unit configured to ascertain wheel speed using a sensor, determine a wheel longitudinal force as a function of the wheel speed, and ascertain longitudinal velocity as a function of the wheel longitudinal force;
   wherein the wheel longitudinal force ($F_{w,x}$) is ascertained as a function of the wheel contact force ($F_{w,z}$) a roadway coefficient of friction ($\mu_{road}$), and a longitudinal slip coefficient of friction ($\mu_w$) which is a function of a wheel longitudinal slip(k):

$F_{w,x} = \max\{\mu_{road}, \mu_w\{\kappa\}\} \cdot F_{w,z}$;

wherein, for equations describing wheel dynamic response $\dot{\hat{x}} = f\{\hat{x}, u\}$ $\hat{y}=h\{\hat{x}\}$ with $\hat{x}=[\hat{\omega}_w \hat{\mu}_{road}]^T$ $u=[M_p M_b F_{w,z} v_x]^T$ an observer equation system of the form $\hat{\dot{x}}=f\{\hat{x},u\}-k\{\hat{x},u\}(\hat{y}31\ y)$, $\hat{y}=h\{\hat{x}\}$ is established, the amplification vector ($k\{\hat{x},u\}$) containing two amplification factors $k_1$, $k_2$), which are one of constant or dependent on a state variable.

11. A driver assistance system in a vehicle having a regulating or control unit, the regulating or control unit configured to ascertain wheel speed using a sensor, determine a wheel longitudinal force as a function of the wheel speed, and ascertain longitudinal velocity as a function of the wheel longitudinal force;

wherein the wheel longitudinal force ($F_{w,x}$) is ascertained as a function of the wheel contact force ($F_{w,z}$), a roadway coefficient of friction ($\mu_{road}$), and a longitudinal slip coefficient of friction ($\mu_w$) which is a function of a wheel longitudinal slip(k):

$F_{w,x}=\max\{\mu_{road},\mu_w\{\kappa\}\}\cdot F_{w,z}$;

wherein, for equations describing wheel dynamic response $\hat{\dot{x}}=f\{\hat{x},u\}$ $\hat{y}=h\{\hat{x}\}$ with $\hat{x}=[\hat{\omega}_w \hat{\mu}_{road}]^T$ $u=[M_p M_b F_{w,z} v_x]^T$ $\hat{y}=\hat{\omega}_w$, an observer equation system of the form $\hat{\dot{x}}=f\{\hat{x},u\}-k\{\hat{x},u\}(\hat{y}-y)$, $\hat{y}=h\{\hat{x}\}$ is established, the amplification vector ($k\{\hat{x},u\}$) containing two amplification factors ($k_1$, $k_2$), which are one of constant or dependent on a state variable.

12. An electronic stability program system having a regulating or control unit configured to ascertain wheel speed using a sensor, determine a wheel longitudinal force as a function of the wheel speed, and ascertain longitudinal velocity as a function of the wheel longitudinal force, and having a sensor system including a yaw rate sensor, a lateral acceleration sensor, and one wheel speed probe per wheel;

wherein the wheel longitudinal force ($F_{w,x}$) is ascertained as a function of the wheel contact force ($F_{w,z}$), a roadway coefficient of friction ($\mu_{road}$) and a longitudinal slip coefficient of friction ($\mu_w$), which is a function of a wheel longitudinal slip (k):

$F_{w,x}=\max\{\mu_{road},\mu_w\{\kappa\}\}\cdot F_{w,z}$;

wherein, for equations describing wheel dynamic response $\hat{\dot{x}}=f\{\hat{x},u\}$ $\hat{y}=h\{\hat{x}\}$ with $\hat{x}=[\hat{\omega}_{w,road}]^T$ $u=[M_p M_b F_{w,z} v_x]^T$ $\hat{y}=\hat{\omega}_w$, an observer equation system of the form $\hat{\dot{x}}=f\{\hat{x},u\}-k\{\hat{x},u\}(\hat{y}-y)$, $\hat{y}=h\{\hat{x}\}$ is established, the amplification vector ($k\{\hat{x},u\}$) containing two amplification factors ($k_1$, $k_2$), which are one of constant or dependent on a state variable.

* * * * *